Jan. 10, 1956 J. B. MURPHY 2,730,200
FLUID BRAKE FOR AUTOMOTIVE VEHICLE
Filed July 3, 1953
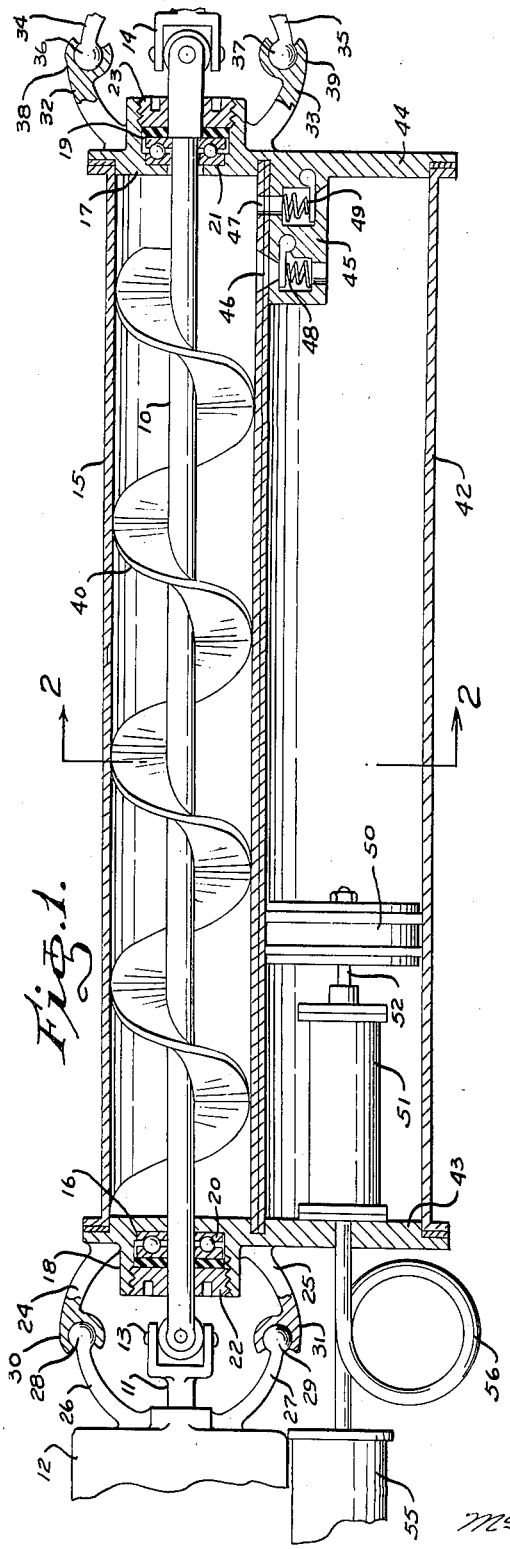
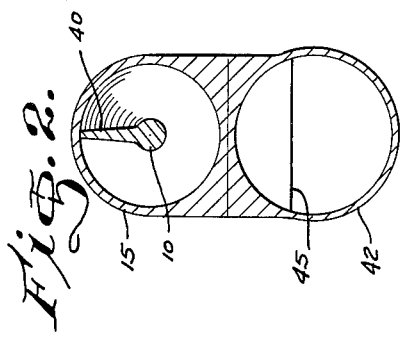
INVENTOR.
John B. Murphy
BY
McMorrow, Berman + Davidson
ATTORNEYS

United States Patent Office 2,730,200
Patented Jan. 10, 1956

2,730,200

FLUID BRAKE FOR AUTOMOTIVE VEHICLE

John B. Murphy, Oceanside, Calif.

Application July 3, 1953, Serial No. 366,041

4 Claims. (Cl. 188—90)

This invention relates to fluid brakes for automotive vehicles and more particularly to a fluid brake mounted on and around a vehicle drive shaft and effective to convert braking effort into heat through fluid friction and to dissipate the heat so generated at a rate to prevent overheating of the fluid.

It is among the objects of the invention to provide an improved fluid brake for an automotive vehicle which can be installed on an existing vehicle with no material modification of the vehicle construction and serves to retard the speed of the vehicle by converting braking effort into heat through fluid friction; which can be placed in operation either automatically or manually when its operation is required; which will retard the speed of a heavy vehicle, such as a large truck, for a long period of time without wear or overheating; which utilizes a spiral screw mounted directly on the vehicle drive shaft and a screw enclosing tube or cylinder to convert the braking effort into fluid friction; and which is simple and durable in construction, economical to manufacture and install, and effective and efficient in operation.

Other objects and advantages will become apparent from a consideration of the following description and the appended claims in conjunction with the accompanying drawing, wherein:

Figure 1 is a longitudinal, medial cross sectional view of a fluid brake mechanism illustrative of the invention with associated parts of the automotive vehicle fragmentarily illustrated; and Figure 2 is a transverse cross sectional view on the line 2—2 of Figure 1.

With continued reference to the drawing, the numeral 10 indicates a vehicle drive shaft connected at one end to the tail shaft 11 of the vehicle transmission 12 through a universal joint connection 13 and connected at its other end to the differential mechanism, not illustrated, of the vehicle through a rear universal joint connection 14.

The fluid brake mechanism comprises a cylinder 15 through which the drive shaft 10 coaxially extends and which is interiorly finished with precision to a constant diameter of predetermined dimension. End walls or plates 16 and 17 close the front and rear ends of the tube or cylinder 15 and are provided with outwardly projecting, cylindrical bearing receptacles 18 and 19 respectively in which antifriction ball or roller bearings 20 and 21 are respectively disposed in surrounding relationship to the vehicle drive shaft 10 and which journal the drive shaft in the end walls of the cylinder. The bearing 20 is maintained in position in the bearing receptacle 18 by a closure plug 22 threaded into the interiorly screw threaded outer end portion of the receptacle 18 and compressing the associated bearing 20 between the inner side of the plug 22 and the end wall 16 at the inner end of the receptacle 18, this plug having a central aperture therein through which the drive shaft 10 extends.

The bearing 21 is secured in the receptacle 19 by a screw plug 23 similar to the plug 22 threaded into the internally screw threaded outer end portion of the bearing receptacle 19 and compressing the antifriction bearing 21 between the inner end of the screw plug 23 and the end wall 17 at the inner end of the bearing receptacle 19.

A fork including diametrically opposed arms 24 and 25 is secured to and extends forwardly from the front end wall 16 and a complementary fork including diametrically opposite arms 26 and 27 is secured to and extends rearwardly from the rear end of the vehicle transmission 12. The arms 26 and 27 are provided at their distal ends with balls 28 and 29 respectively which are received in ball sockets 30 and 31 on the distal ends of the arms 24 and 25 to support the front end of the cylinder 15 from the vehicle transmission 12 so that the weight of the cylinder will not be imposed on the vehicle drive shaft 10.

A fork including diametrically opposed arms 32 and 33 is secured to and projects rearwardly from the rear end wall 17 of the brake cylinder or tube 15 and a fork including arms 34 and 35 is secured on and projects forwardly from the vehicle differential mechanism, the arms 34 and 35 having ball formations 36 and 37 on their distal ends received in socket formations 38 and 39 provided on the distal ends of the arms 32 and 33 so that the rear yokes support the rear end of the cylinder 15 from the differential mechanism of the vehicle and prevent the weight of the rear end of the cylinder 15 from being imposed on the vehicle drive shaft 10.

A spiral screw 40 is wound around the vehicle drive shaft 10 substantially from one end to the other of the cylinder 15 and has its outer edge surface in contact with the precision finished inner surface of the cylinder 15 so that this spiral screw and the screw enclosing cylinder 15 constitutes a fluid pump when the drive shaft 10 is rotated.

A second cylinder 42 extends longitudinally of the cylinder 15 and is secured along its outer surface to the outer surface of the cylinder 15. The cylinder 42 has a length substantially equal to the length of the cylinder 15 and the cylinder end walls 16 and 17 are extended to provide end walls 43 and 44 respectively closing the front and rear ends of the cylinder 42. A valve block 45 is secured in the cylinder 42 against the inner side of the end wall 44 and at the location around the cylinder 42 at which this cylinder is joined to the cylinder 15 and this valve block has therein spaced apart valve passages 46 and 47 which place the interior of the cylinder 42 in communication with the interior of the cylinder 15. Spring closed check valves 48 and 49 are disposed in the passages 46 and 47 respectively, the check valve 48 being effective to preclude passage of fluid through the passage 46 from the cylinder 42 into the cylinder 15 while providing for the passage of fluid under pressure from the cylinder 15 into the cylinder 42 and the valve 49 being effective to preclude passage of fluid from the cylinder 15 into the cylinder 42 while permitting the passage of fluid under pressure from the cylinder 42 into the cylinder 15.

A piston 50 is slidably disposed in the cylinder 42 and a hydraulic cylinder and piston device 51, constituting a hydraulic jack or ram, is mounted in the front portion of the cylinder 42 with its front end against the inner surface of the front end wall 43 of the cylinder 42. The device 51 is disposed substantially coaxially of the cylinder 42 and the piston 50 has a piston rod 52 which extends into the rear end of the cylinder of the device 51 and is connected within this cylinder to a piston, not illustrated, so that the admission of hydraulic fluid under pressure into the front end of the device 51 will force the piston 50 rearwardly of the cylinder 42.

It will be noted that the cylinder 42 has a diameter greater than the diameter of the cylinder 15 so that a movement of the piston 50 rearwardly of the cylinder 42 for a distance less than the length of this cylinder will substantially fill the cylinder 15 with hydraulic fluid.

A fluid pressure generator 55 is mounted on and driven by the vehicle transmission 12 and is responsive to manual control to force hydraulic fluid under pressure into the hydraulic device 51 through a conduit 56 which connects the generator 55 to the interior of the device 51 at the front end of this device.

The space within the cylinder 42 between the piston 50 when the piston is in retracted position, as illustrated in Figure 1, and the rear end wall 44 of the cylinder 42 are filled with hydraulic fluid. When it is desired to place the fluid brake in operation the piston 50 is forced rearwardly in the cylinder 42 forcing the hydraulic fluid out of this cylinder through the check valve 49 into the cylinder 15. When the cylinder 15 has been filled and as the screw 40 turns in the cylinder it attempts to force the fluid in the cylinder 15 rearwardly against the rear end wall 17 and the fluid, being stopped by this rear end wall, flows forwardly relative to the screw through the extremely restricted passage between the outer end surface of the screw and the inner surface of the cylinder 15. The fluid friction thus created between the screw and the cylinder 15 retards the forward speed of the vehicle and is converted into heat of the fluid in the cylinder 15 and this heat developed by the braking effort is dissipated through the wall of the cylinder 15.

When the braking effect of the fluid brake is no longer required the action of the pressure generator 55 is terminated and the screw 40 then forces any fluid in the cylinder 15 out of this cylinder through the valve 48 and passage 46 into the cylinder 42 forcing the piston 50 back to its retracted position. When the cylinder 15 has been emptied of brake fluid the screw 40 will turn freely in this cylinder and will produce no braking action, the fluid brake mechanism thus producing no brake drag on the vehicle at times when the fluid brake is not in use.

From the foregoing, it will be apparent that there has been provided in combination with an automotive vehicle drive shaft connecting the vehicle transmission to the differential mechanism, a fluid brake mechanism which comprises a pair of spaced end plates or walls 16 and 17 carried by the transmission and differential mechanism respectively, a cylinder 15 coaxially surrounding the drive shaft 10 and extending between the end plates 16 and 17 which define end walls therefor and through which the drive shaft 10 may extend, a spiral screw 40 carried by the drive shaft 10 for rotation therewith and having its outer edge contacting the inner surface of the cylinder 40, a hydraulic liquid reservoir 42 extending between the end plates or walls 16 and 17 which define end walls therefor and the reservoir 42 being disposed in adjoining relation to the cylinder 15 so that the end plates 16 and 17 define common end walls for the cylinder and reservoir, means in the form of check valve operated passages 46 and 47 in the reservoir 42 adjacent one end thereof for communicating with the cylinder 15, and fluid pressure operated means in the form of the hydraulic cylinder and piston device 51 effective to force hydraulic liquid from the reservoir through the communicating means into the cylinder to provide resistance against which the spiral screw 40 will move to impart a braking action to the drive shaft upon rotation thereof, a communicating means permitting the hydraulic liquid to return to the reservoir 42 when the fluid pressure operated means 51 is inactivated.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an automotive vehicle drive shaft connecting the vehicle transmission to the differential mechanism of the vehicle, fluid brake mechanism comprising a cylinder coaxially receiving said drive shaft and having end walls closing its front and rear ends and through which said drive shaft extends, a spiral screw surrounding said drive shaft between said end walls and having its outer edge surface substantially in contact with the inner surface of said cylinder, means providing a fluid reservoir carried by said end walls which close the opposite sides thereof and communicating with the interior of said cylinder at one end thereof, and fluid pressure operated means carried by said reservoir adjacent the other end and effective to force hydraulic fluid from said reservoir into said cylinder and to enable said spiral screw to return the hydraulic fluid from said cylinder to said reservoir.

2. In combination with an automotive vehicle drive shaft connecting the vehicle transmission to the differential mechanism of the vehicle, a fluid brake mechanism comprising a pair of spaced end plates, one of said plates carried by said transmission and the other of said plates carried by said differential mechanism, a cylinder coaxially surrounding said drive shaft and extending between said end plates which define end walls therefor through which said drive shaft extends, a spiral screw carried by said drive shaft for rotation therewith and having its outer edge surface in contact with the inner surface of the cylinder, a hydraulic liquid reservoir extending between said end plates which define end walls therefor and disposed in adjoining relation to said cylinder, means carried by said reservoir for communicating with said cylinder, and fluid pressure operated means effective to force hydraulic liquid from said reservoir through said first mentioned means into said cylinder to provide resistance against which said spiral screw moves to impart a braking action to said drive shaft, said first mentioned means permitting the hydraulic liquid to return to said reservoir when said fluid pressure operated means is inactivated.

3. In combination with an automotive vehicle drive shaft connecting the vehicle transmission to the differential mechanism of the vehicle, a fluid brake mechanism comprising a pair of spaced end plates, one of said plates carried by said transmission and the other of said plates carried by said differential mechanism, a cylinder coaxially surrounding said drive shaft and extending between said end plates which define end walls therefor through which said drive shaft extends, a spiral screw carried by said drive shaft for rotation therewith and having its outer edge surface in contact with the inner surface of the cylinder, a hydraulic liquid reservoir extending between said end plates which define end walls therefor and disposed in adjoining relation to said cylinder, means carried by said reservoir for communicating with said cylinder, and fluid pressure operated means effective to force hydraulic liquid from said reservoir through said first mentioned means into said cylinder to provide resistance against which said spiral screw moves to impart a braking action to said drive shaft, said first mentioned means permitting the hydraulic liquid to return to said reservoir when said fluid pressure operated means is inactivated, each of said end plates carrying a fork including a pair of opposed outwardly extending arms for attachment to complementary arms carried by said transmission and said differential mechanism respectively.

4. In combination with an automotive vehicle drive shaft connecting the vehicle transmission to the differential mechanism of the vehicle, a fluid brake mechanism comprising a pair of spaced end plates, one of said plates carried by said transmission and the other of said plates carried by said differential mechanism, a cylinder coaxially surrounding said drive shaft and extending between said end plates which define end walls therefor through which said drive shaft extends, a spiral screw carried by said drive shaft for rotation therewith and having its outer edge surface in contact with the inner surface of the cylinder, a hydraulic liquid reservoir extending between said end plates which define end walls therefor and disposed in adjoining relation to said cylinder, means carried by said reservoir for communicating with said cylinder, and fluid pressure operated means effective to force hydraulic liquid from said reservoir through said first mentioned means into said cylinder to provide resistance against which said spiral screw moves to impart a braking action to said drive shaft, said first mentioned means permitting the hydraulic liquid to return to said reservoir when said fluid pressure operated means is inactivated, each of said end plates carrying a fork including a pair of opposed outwardly extending arms, each arm of said pair having a ball socket formed at its terminal end, and complementary arms carried by said transmission and differential mechanism respectively, each of said complementary arms having a ball formed at its free end for engagement in a complemental socket whereby said fluid brake mechanism is supported between said transmission and differential mechanism without imposing a weight load upon said drive shaft.

References Cited in the file of this patent

UNITED STATES PATENTS

| | | |
|---|---|---|
| 712,048 | Diamant et al. | Oct. 28, 1902 |
| 2,225,079 | Neal | Dec. 17, 1940 |
| 2,342,959 | Neal | Feb. 29, 1944 |
| 2,551,677 | Hoffstrom | May 8, 1951 |
| 2,573,831 | Burckhalter | Nov. 6, 1951 |